US012812338B2

(12) United States Patent
Chai et al.

(10) Patent No.: US 12,812,338 B2
(45) Date of Patent: Nov. 24, 2026

(54) METHOD AND APPARATUS FOR TRANSMITTING MULTICAST BROADCAST SERVICE, AND COMMUNICATION NODE

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Li Chai, Beijing (CN); Xiaoman Liu, Beijing (CN); Yuzhen Liu, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 296 days.

(21) Appl. No.: 18/709,053

(22) PCT Filed: Nov. 3, 2022

(86) PCT No.: PCT/CN2022/129633

§ 371 (c)(1),
(2) Date: May 10, 2024

(87) PCT Pub. No.: WO2023/083096

PCT Pub. Date: May 19, 2023

(65) Prior Publication Data

US 2025/0008305 A1 Jan. 2, 2025

(30) Foreign Application Priority Data

Nov. 12, 2021 (CN) ........................ 202111339830.3

(51) Int. Cl.
*H04W 4/08* (2009.01)

(52) U.S. Cl.
CPC .................................... *H04W 4/08* (2013.01)

(58) Field of Classification Search
None
See application file for complete search history.

(56) References Cited

U.S. PATENT DOCUMENTS

2017/0134080 A1* 5/2017 Rahman .............. H04B 7/0478
2018/0139665 A1 5/2018 Park et al.
(Continued)

FOREIGN PATENT DOCUMENTS

CN 103108285 A 5/2013
CN 103428782 A 12/2013
(Continued)

OTHER PUBLICATIONS

Ericsson. "Conditional Handover-Data Forwarding" 3GPP TSG-RAN WG3 Meeting #105, R3-194376, vol. , No. , Aug. 30, 2019 (Aug. 30, 2019), ISSN:, 7 pages.
(Continued)

*Primary Examiner* — Anh Vu H Ly
(74) *Attorney, Agent, or Firm* — COOPER LEGAL GROUP LLC

(57) ABSTRACT

Provided in the present application are a method and apparatus for transmitting a multicast broadcast service, and a communication node. The method includes: during the process of a first group receiving a multicast broadcast service, when it is determined that a cell where a terminal in the first group is located changes at a second moment, sending group switching information to one or more second communication nodes at a first moment, wherein the first moment is before the second moment. By using the method, a communication node determines the change in a multicast ser-
(Continued)

vice group in advance, and before the multicast service group changes, the communication node sends group switching information to a communication node which a terminal in the multicast service group is about to access, so as to trigger the communication node which has acquired the group switching information to establish, in advance, a connection with a core network that supports the multicast broadcast service, thereby avoiding service interruption caused by the change in the multicast service group.

16 Claims, 10 Drawing Sheets

(56) References Cited

U.S. PATENT DOCUMENTS

| | | | | |
|---|---|---|---|---|
| 2021/0368407 | A1* | 11/2021 | Shrestha | H04B 7/18541 |
| 2022/0046486 | A1* | 2/2022 | Shrestha | H04W 36/0009 |
| 2022/0345947 | A1 | 10/2022 | Cao et al. | |

FOREIGN PATENT DOCUMENTS

| | | | |
|---|---|---|---|
| CN | 106341796 | A | 1/2017 |
| CN | 106341848 | A | 1/2017 |
| CN | 106489274 | A | 3/2017 |
| CN | 108111424 | A | 6/2018 |
| CN | 110035398 | A | 7/2019 |
| EP | 3866508 | A1 | 8/2021 |
| EP | 4044454 | A1 | 8/2022 |
| EP | 4099760 | A1 | 12/2022 |
| WO | 2021081827 | A1 | 5/2021 |
| WO | 2021088598 | A1 | 5/2021 |
| WO | 2021092810 | A1 | 5/2021 |
| WO | 2021093145 | A1 | 5/2021 |
| WO | 2021174377 | A1 | 9/2021 |
| WO | 2021223666 | A1 | 11/2021 |

OTHER PUBLICATIONS

International Search Report in the international application No. PCT/CN2022/129633, mailed on Jan. 18, 2023. 3 pages.

English translation of the Written Opinion of the International Search Authority in the international application No. PCT/CN2022/129633, mailed on Jan. 18, 2023. 4 pages.

Supplementary European Search Report in the European application No. 22891891.8, mailed on Oct. 1, 2025, 11 pages.

Qualcomm Incorporated, "MBMS reception in Receive Only Mode", 3GPP TSG-RAN2 Meeting #104 R2-1817787 Spokane, USA, Nov. 12-16, 2018, pp. 1-10.

* cited by examiner

METHOD AND APPARATUS FOR TRANSMITTING MULTICAST BROADCAST SERVICE, AND COMMUNICATION NODE

CROSS-REFERENCE TO RELATED APPLICATION

This application is based on and claims priority to Chinese patent application No. 202111339830.3 filed on Nov. 12, 2021, the content of which is hereby incorporated by reference in its entirety.

TECHNICAL FIELD

The disclosure relates to the field of wireless technology, and in particular to a method and an apparatus for transmitting a multicast broadcast service, and a communication node.

BACKGROUND

Due to a characteristic that a coverage area of satellites is much larger than a coverage area of terrestrial base stations, it is a current development trend of a Multimedia Broadcast Multicast Service (MBMS) to send a multicast broadcast service through the satellite communication.

However, satellites in a non-geosynchronous orbit move at a high speed with respect to a fixed position on the Earth, leading to frequent and unavoidable switching between geostationary and mobile satellites, which may result in significant signaling overheads and impacts on power consumption, and exacerbate other potential challenges related to mobility such as service interruption due to a signaling delay. For example, at a moment t1, User equipment (UE) 1-UE5 are in a cell and configured in a multicast group, and receive the same multicast service with the same configuration information. At a moment t2, with the movement of the satellite, UE1-UE5, which are in the multicast group, are distributed to two different cells. How to ensure that the multicast broadcast service is not interrupted is a serious problem.

SUMMARY

The purpose of the technical solution of the disclosure is to provide a method and an apparatus for transmitting a multicast broadcast service, and a communication node, so as to solve the problem that the frequent switching of multicast groups due to the high-speed movement of the satellites results in the interruption of the multicast broadcast service.

An embodiment of the disclosure further provides a method for transmitting a multicast broadcast service. The method is performed by a first communication node and includes the following operation.

During that a first group receives the multicast broadcast service, when it is determined that a cell where a UE(s) in the first group is located will be changed at a second moment, group switching information is sent to one or more second communication nodes at a first moment.

The first moment is before the second moment.

Optionally, in the method for transmitting the multicast broadcast service, the operation that it is determined that the cell where the UE in the first group is located will be changed at the second moment may include the following operation.

It is determined whether the cell where the UE is located will be changed at the second moment according to information of the cell where the UE is located.

The information of the cell where the UE is located is determined according to at least one of:

a satellite moving track;

position of the UE;

multicast service information;

satellite type information; or mobility information of the UE.

Optionally, in the method for transmitting the multicast broadcast service, when it is determined that the cell where the UE in the first group is located will be changed at the second moment, the group switching information is sent to the one or more second communication nodes at the first moment, which may include the following operation.

The group switching information is sent to the one or more second communication nodes at the first moment when it is determined that the cell where the UE in the first group is located will be changed at at least one second moment.

Each of the at least one second moment is different, and the first moment is a moment before each of the at least one second moment.

Optionally, in the method for transmitting the multicast broadcast service, the one or more second communication nodes may include a target satellite node corresponding to the UE in the first group when the UE is switched to a second group.

The operation that the group switching information is sent to the one or more second communication nodes may include the following operation.

Group information of the first group and UE information of the UE in the first group are sent to the target satellite node.

Optionally, in the method for transmitting the multicast broadcast service, after the group switching information is sent to the one or more second communication nodes at the first moment, the method may further include the following operation.

Information of the second group fed back by one of the one or more second communication nodes is received.

The information of the second group includes at least one of:

- a Physical Cell Identifier (PCI) where the second group is located;
- a group service identifier corresponding to the second group;
- a Quality of Service (QoS) flow of the second group;
- configuration information of a shared tunnel of the second group;
- configuration information of a layer 2 protocol stack of the second group;
- physical layer configuration information of the second group;
- UE information of a UE included in the second group; or
- an activation time and a deactivation time of the second group.

The UE information of the UE included in the second group includes at least one of:

- a Cell-Radio Network Temporary Identifier (C-RNTI) of the UE;
- whether the UE is configured with a Precision Time Protocol (PTP) channel; or
- whether the UE is configured with a Data Radio Bearer (DRB) other than the multicast broadcast service.

Optionally, in the method for transmitting the multicast broadcast service, after the group switching information is sent to the one or more second communication nodes at the first moment, the method may further include the following operation.

Air interface information of the second group is sent to the UE in the first group.

The air interface information of the second group includes at least one of:

- the PCI where the second group is located;
- the QoS flow of the second group;
- the configuration information of the shared tunnel of the second group;
- the configuration information of the layer 2 protocol stack of the second group;
- the physical layer configuration information of the second group; or
- the activation time and the deactivation time of the second group.

Optionally, in the method for transmitting the multicast broadcast service, the one or more second communication nodes may include the target satellite node corresponding to the UE in the first group when the UE is switched to the second group.

The operation that the group switching information is sent to the one or more second communication nodes may include the following operation.

Multicast path configuration information is sent to the target satellite node.

The first communication node shares a set of layer 2 protocol stack configuration with the target satellite node. Different target multicast broadcast services have the same tunnel information, the same Multicast Broadcast Service (MBS) session information and the same MBS source multicast address between the first communication node and a core network.

An embodiment of the disclosure further provides a method for transmitting a multicast broadcast service. The method is performed by a second communication node and includes the following operations.

During that a first group receives the multicast broadcast service, the second communication node receives group switching information from a first communication node at a first moment. The group switching information is configured to indicate that a corresponding communication node of a cell where a UE in the first group is located will be switched from a third communication node to the second communication node at a second moment.

Resource information for switching the UE in the first group to a second group is sent to the third communication node according to the group switching information.

The first moment is before the second moment.

Optionally, in the method for transmitting the multicast broadcast service, the group switching information may include:

- group information of the first group and UE information of the UE in the first group.

Optionally, the method for transmitting the multicast broadcast service may further include the following operation.

A connection with a core network for the multicast broadcast service is established according to the group switching information before the second moment.

Optionally, the method for transmitting the multicast broadcast service may further include the following operation.

When a multicast broadcast service received by the UE in the first group and a multicast broadcast service received by a UE in a fourth group are of the same type of service, the UE in the first group and the UE in the fourth group are combined into a single group.

Optionally, in the method for transmitting the multicast broadcast service, the resource information may include at least one of:

- a PCI where the second group is located;
- a group service identifier corresponding to the second group;
- a QoS flow of the second group;
- configuration information of a shared tunnel of the second group;
- configuration information of a layer 2 protocol stack of the second group;
- physical layer configuration information of the second group;
- information of a UE of the second group; or
- an activation time and a deactivation time of the second group.

The information of the UE of the second group includes at least one of:

- a C-RNTI of the UE;
- whether the UE is configured with a PTP channel; or
- whether the UE is configured with a DRB other than the multicast broadcast service.

An embodiment of the disclosure further provides a method for transmitting a multicast broadcast service. The method is performed by a first communication node and includes the following operation.

During that a first group receives a target multicast broadcast service, resource information for switching a UE in the first group to a second group at a second moment is received from a second communication node at a first moment.

The first moment is before the second moment.

Optionally, the method for transmitting the multicast broadcast service may further include the following operation.

At least one of the following information is sent to the UE in the first group according to the resource information:

- group information of the second group;
- configuration information of the second group;
- a UE channel of the second group; or
- an activation time and a deactivation time of the second group.

Optionally, the method for transmitting the multicast broadcast service may further include the following operation.

A dynamic MBS group list is sent to the UE in the first group. The dynamic MBS group list includes group information and resource information of at least two multicast groups and a switching time corresponding to each of the at least two multicast groups.

After the resource information is received, the method may further include the following operation.

A switching instruction is sent to the UE. The switching instruction is configured to instruct the UE to switch to a multicast group in the dynamic MBS group list at the second moment.

Optionally, in the method for transmitting the multicast broadcast service, the switching instruction may be sent through a Medium Access Control Control Element (MAC CE) or a Downlink Control Information (DCI) signaling.

An embodiment of the disclosure further provides a communication node. The communication node is a first communication node and includes a transceiver.

The transceiver is configured to: during that a first group receives a multicast broadcast service, send group switching information to one or more second communication nodes at a first moment when it is determined that a cell where a UE(s) in the first group is located will be changed at a second moment.

The first moment is before the second moment.

Optionally, the communication node may further include a processor. The processor is configured to:

determine whether the cell where the UE is located will be changed at the second moment according to information of the cell where the UE is located.

The processor is configured to determine the information of the cell where the UE is located according to at least one of:

a satellite moving track;

position of the UE;

multicast service information;

satellite type information; or mobility information of the UE.

Optionally, in the communication node, the transceiver being configured to send the group switching information to the one or more second communication nodes at the first moment when it is determined that the cell where the UE in the first group is located will be changed at the second moment may include that the transceiver is configured to:

send the group switching information to the one or more second communication nodes at the first moment when it is determined that the cell where the UE in the first group is located will be changed at at least one second moment.

Each of the at least one second moment is different, and the first moment is a moment before each of the at least one second moment.

Optionally, in the communication node, the one or more second communication nodes may include a target satellite node corresponding to the UE in the first group when the UE is switched to a second group.

The transceiver being configured to send the group switching information to the one or more second communication nodes may include that the transceiver is configured to:

send group information of the first group and UE information of the UE in the first group to the target satellite node.

Optionally, in the communication node, after sending the group switching information to the one or more second communication nodes at the first moment, the transceiver may be further configured to:

receive information of the second group fed back by one of the one or more second communication nodes.

The information of the second group includes at least one of:

a PCI where the second group is located;

a group service identifier corresponding to the second group;

a QoS flow of the second group;

configuration information of a shared tunnel of the second group;

configuration information of a layer 2 protocol stack of the second group;

physical layer configuration information of the second group;

UE information of a UE included in the second group; or an activation time and a deactivation time of the second group.

The UE information of the UE included in the second group includes at least one of:

a C-RNTI of the UE;

whether the UE is configured with a PTP channel; or whether the UE is configured with a DRB other than the multicast broadcast service.

Optionally, in the communication node, after sending the group switching information to the one or more second communication nodes at the first moment, the transceiver may be further configured to:

send air interface information of the second group to the UE in the first group.

The air interface information of the second group includes at least one of:

the PCI where the second group is located;

the QoS flow of the second group;

the configuration information of a shared tunnel of the second group;

the configuration information of a layer 2 protocol stack of the second group;

the physical layer configuration information of the second group; or the activation time and the deactivation time of the second group.

Optionally, the one or more second communication nodes may include the target satellite node corresponding to the UE in the first group when the UE is switched to the second group.

The transceiver being configured to send the group switching information to the one or more second communication nodes may include that the transceiver is configured to:

send multicast path configuration information to the target satellite node.

The first communication node shares a set of layer 2 protocol stack configuration with the target satellite node, and different target multicast broadcast services have the same tunnel information, the same MBS session information and the same MBS source multicast address between the first communication node and a core network.

An embodiment of the disclosure further provides a communication node. The communication node is a second communication node and includes a transceiver. The transceiver is configured to:

receive, by the second communication node, group switching information from a first communication node at a first moment during that a first group receives a multicast broadcast service. The group switching information is configured to indicate that a corresponding communication node of a cell where a UE in the first group is located will be switched from a third communication node to the second communication node at a second moment.

The transceiver is further configured to send resource information for switching the UE in the first group to a second group to the third communication node according to the group switching information.

The first moment is before the second moment.

Optionally, in the communication node, the group switching information may include:

group information of the first group and UE information of the UE in the first group.

Optionally, the communication node may further include a processor. The processor is configured to:

establish a connection with a core network for the multicast broadcast service before the second moment according to the group switching information.

Optionally, the communication node may further include the processor. The processor is configured to:

combine the UE in the first group and a UE in a fourth group into a single group when a multicast broadcast service received by the UE in the first group and a multicast broadcast service received by the UE in the fourth group are of the same type of service.

Optionally, in the communication node, the resource information may include at least one of:

a PCI where the second group is located;

a group service identifier corresponding to the second group;

a QoS flow of the second group;

configuration information of a shared tunnel of the second group;

configuration information of a layer 2 protocol stack of the second group;

physical layer configuration information of the second group;

information of a UE of the second group; or an activation time and a deactivation time of the second group.

The information of the UE of the second group includes at least one of:

a C-RNTI of the UE;

whether the UE is configured with a PTP channel; or whether the UE is configured with a DRB other than the multicast broadcast service.

An embodiment of the disclosure further provides a communication node. The communication node is a third communication node and includes a transceiver. The transceiver is configured to:

during that a first group receives a target multicast broadcast service, receive, from a second communication node at a first moment, resource information for switching a UE in the first group to a second group at a second moment.

The first moment is before the second moment.

Optionally, in the communication node, the transceiver may be further configured to:

send at least one of the following information to the UE in the first group according to the resource information:

group information of the second group;

configuration information of the second group;

a UE channel of the second group; or an activation time and a deactivation time of the second group.

Optionally, in the communication node, the transceiver may be further configured to:

send a dynamic MBS group list to the UE in the first group. The dynamic MBS group list includes group information and resource information of at least two multicast groups and a switching time corresponding to each of the at least two multicast groups.

After receiving the resource information, the transceiver may be further configured to:

send a switching instruction to the UE. The switching instruction is configured to instruct the UE to switch to a multicast group in the dynamic MBS group list at the second moment.

Optionally, in the communication node, the switching instruction may be sent through an MAC CE or a DCI signaling.

An embodiment of the disclosure further provides an apparatus for transmitting a multicast broadcast service. The apparatus is applied to a first communication node and includes a first transceiver module.

The first transceiver module is configured to: during that a first group receives the multicast broadcast service, when it is determined that a cell where a UE(s) in the first group is located will be changed at a second moment, send group switching information to one or more second communication nodes at a first moment.

The first moment is before the second moment.

An embodiment of the disclosure further provides an apparatus for transmitting a multicast broadcast service. The apparatus is applied to a second communication node and includes a receiving module and a sending module.

The receiving module is configured to receive group switching information from a first communication node at a first moment during that a first group receives the multicast broadcast service. The group switching information is configured to indicate that a corresponding communication node of a cell where a UE in the first group is located will be switched from a third communication node to the second communication node at a second moment.

The sending module is configured to send resource information for switching the UE in the first group to a second group to the third communication node according to the group switching information.

The first moment is before the second moment.

An embodiment of the disclosure further provides an apparatus for transmitting a multicast broadcast service. The apparatus is applied to a third communication node and includes a second transceiver module.

The second transceiver module is configured to: during that a first group receives a target multicast broadcast service, receive resource information for switching a UE in the first group to a second group at a second moment from a second communication node at a first moment.

The first moment is before the second moment.

An embodiment of the disclosure further provides a network device, including a processor, a memory and a program stored on the memory and executable on the processor. The program implements, when executed by the processor, the method for transmitting the multicast broadcast service of any one of the above.

An embodiment of the disclosure further provides a readable storage medium having stored thereon a program. The program implements, when executed by a processor, the method for transmitting the multicast broadcast service of any one of the above.

At least one of the above technical solutions of the disclosure has the following beneficial effects.

With the method for transmitting the multicast broadcast service of the embodiments of the disclosure, by determining the change of the multicast service group in advance, the communication node sends group switching information to a communication node to be accessed by the UE in the multicast service group before the multicast service group changes, to trigger the communication node obtaining the group switching information to establish a connection in advance with the core network that supports the multicast broadcast service, thereby avoiding service interruption due to the change of the multicast service group.

DETAILED DESCRIPTION

In order to make the technical problems to be solved, technical solutions and advantages of the disclosure clearer, a detailed description would be provided below in combination with the drawings and specific embodiments.

The MBMS is a point-to-multipoint service, such as a mobile phone, a television, or the like. In the Long Term Evolution (LTE), when a service of the Multicast Broadcast Single Frequency Network (MBSFN) is transmitted, the evolved NodeB (eNB) of multiple cells in the MBSFN Area are required to transmit the same data at the same time. In this way, the UE would not only be protected from the inter-cell interference when neighbouring cells transmit data, but also benefit from superposition of signals from multiple cells. The UE receives and combines signals from multiple eNBs, which may improve the signal-to-noise ratio, and effectively improve the transmission efficiency of the MBMS.

Due to the characteristic that the coverage area of satellites is much larger than the coverage area of terrestrial base stations, it is a current development trend of the MBMS to send a multicast broadcast service through the satellite communication. However, satellites in a non-geosynchronous orbit move at a high speed with respect to a fixed position on the Earth, which may result in the frequent switching between geostationary and mobile satellites, thereby causing the service interruption in multicast broadcast services due to the signaling delay. To solve the technical problem, an embodiment of the disclosure provides a method for transmitting a multicast broadcast service. By determining the change of the multicast service group in advance, the communication node sends group switching information to a communication node to be accessed by the UE in the multicast service group before the multicast service group changes, to trigger the communication node obtaining the group switching information to establish a connection in advance with the core network that supports the multicast broadcast service, thereby avoiding service interruption due to the change of the multicast service group.

An embodiment of the disclosure provides a method for transmitting a multicast broadcast service, and the method is performed by a first communication node.

Figure 1:
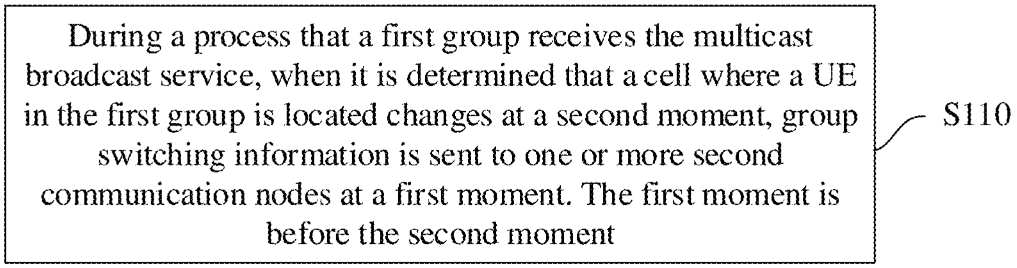
FIG. 1 is a flowchart illustrating a transmission method of an embodiment of the disclosure being applied to a first communication node.

As shown in FIG. 1, the method includes the following operations.

In operation S110, during that a first group receives the multicast broadcast service, when it is determined that a cell where a UE(s) in the first group is located will be changed at a second moment, group switching information is sent to one or more second communication nodes at a first moment.

The first moment is before the second moment.

In the embodiments of the disclosure, optionally, the first communication node is one of the communication nodes of the network side device, and the first communication node may be one of the satellite base stations which may determine the change of the multicast service group. Optionally, the first communication node may be one of the network nodes that is sending the multicast broadcast service, or a central node for unified maintenance on dynamic group switching.

Optionally, the group switching information includes at least one of group information of the multicast broadcast service (at least one of group information of the first group or group information of a second group that is required to be switched to) or UE information of the to-be-switched UE.

With the method for transmitting the multicast broadcast service of the embodiment, during that the first group receives the multicast broadcast service, when it is determined that the cell where the UE in the first group is located will be changed at the second moment, the first communication node sends the group switching information to one or more second communication nodes at the first moment which is before the second moment. Optionally, the second communication node is a communication node to be accessed by the UE in the first group. In this way, the communication node to be accessed by the UE in the first group is enabled to establish a connection in advance with a core network that supports the multicast broadcast service according to the group switching information, thereby avoiding the problem of service interruption due to the change of the multicast service group.

Figure 2:
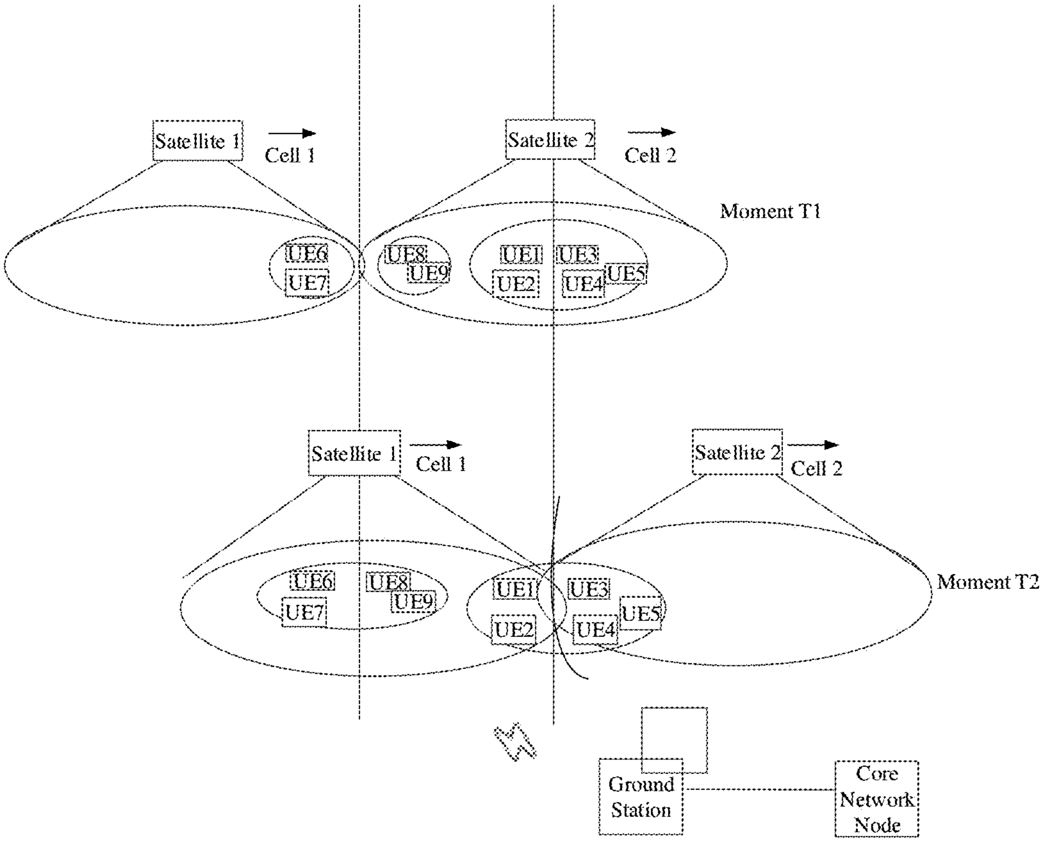
FIG. 2 is a structure diagram of an application system adopting a transmission method of an embodiment of the disclosure.

For example, with reference to FIG. 2, at the first moment T1, UE1 to UE5 are in a first group, and the first group receives the multicast broadcast service in the cell 2 where the satellite base station 2 is located. UE8 and UE9 are in a second group, and the second group receives the multicast broadcast service in the cell 2 where the satellite base station 2 is located. UE6 and UE7 are in a third group, and the third group receives the multicast broadcast service in the cell 1 where the satellite base station 1 is located. Based on such multicast configuration, it is assumed that it is determined, at the first moment T1, that the group switching will occur at the second moment T2 (for example, at the second moment T2, UE1 to UE5 are switched to be in a group in which some UEs are located in the cell 1 and some UEs are located in the cell 2, and UE6 to UE9 are switched to be in a group in which some UEs are located in the cell 1). In such case of group switching, the first communication node may determine the group switching will occur at the second moment T2 in advance, and send the group switching information to at least one satellite base station at the first moment T1 which is before the second moment T2.

In the embodiment, the group change occurs in UE1 to UE9, for example, a group change occurs in UE8 and UE9 (i.e., UE8 and UE9 are to be switched from the satellite base station 2 to the satellite base station 1). The first communication node sends the group switching information to the satellite base station 1 in advance, such that the satellite base station 1 establishes a connection with the core network that supports the current multicast broadcast service of UE8 and UE9, thereby avoiding the problem of service interruption due to the change of the multicast service group.

Based on the above principle, in an implementation, in combination with FIG. 2, due to the high-speed movement of satellites, at the second moment, a UE in the first group may be switched from the satellite base station 1 to the satellite base station 2, and from the first group to the second group. Based on the implementation, the first communication node (which may be a communication node different from the satellite base station 1 and the satellite base station 2) sends the group switching information to the satellite base station 1 and the satellite base station 2 respectively at the first moment which is before the second moment, and the group switching information includes the group information of the first group and the group information of the second group, and/or the UE information of the UE that needs to be switched from the first group to the second group.

In another implementation, due to the high-speed movement of the satellites, at the second moment, multiple UEs in the first group may be switched from the satellite base station 1 to the satellite base station 2, and the multiple UEs are switched from the first group to the second group, the third group, . . . , the m-th group respectively. Based on the implementation, the first communication node (which may be a communication node different from the satellite base station 1 and the satellite base station 2) sends the group switching information to the satellite base station 1 and the satellite base station 2 at the first moment which is before the second moment, and the group switching information includes group information of the first group to the m-th group, and/or UE information of UEs to be subjected to the group switching.

In yet another implementation, due to the high-speed movement of the satellites, at the second moment, multiple UEs in the first group may be switched from the satellite base station 1 to the satellite base station 2, satellite base station 3, . . . , satellite base station k, and the multiple UEs are switched from the first group to the second group, the third group, . . . , the m-th group. Based on the implementation, the first communication node (which may be a communication node different from the satellite base station 1 and the satellite base station 2) sends the group switching information in sequence to the satellite base station 1, the satellite base station 2, the satellite base station 3, . . . , the satellite base station k at (k−1) first moments which are before the second moment, and the group switching information includes group information of the first group to the m-th group, and/or UE information of UEs to be subjected to the group switching. Optionally, the (k−1) first moments may be the same moment, or may be different moments.

In yet another implementation, optionally, the first communication node may, at the same moment, predict group changes at multiple moments, such that the first communication node may send group switching information of the group changes in advance to the to-be-accessed communication node.

Based on the above implementation, in the operation S110, when it is determined that the cell where the UE in the first group is located will be changed at the second moment, the group switching information is sent to the one or more second communication nodes at the first moment, which may include the following operation.

The group switching information is sent to the one or more second communication nodes at the first moment when it is determined that the cell where the UE in the first group is located will be changed at at least one second moment.

Each of the at least one second moment is different, and the first moment is a moment before each of the at least one second moment.

With the implementation, the one or more second communication nodes are to-be-connected target communication nodes when cells of multiple UEs in the first group change. The first communication node may send the group switching information to multiple second communication nodes respectively at different moments.

In the embodiment of the disclosure, optionally, the method further includes the following operation.

The first communication node determines whether the cell where the UE is located will be changed at the second moment according to information of the cell where the UE is located.

The information of the cell where the UE is located is determined according to at least one of:

a satellite moving track;
position of the UE;
multicast service information;
satellite type information; or
mobility information of the UE.

According to at least one of the satellite moving track, the position of the UE, the multicast service information, the satellite type information, or the mobility information of the UE, the first communication node determines whether the information of the cell where the UE is located changes, and thereby determines whether the cell where the UE is located changes, so as to send the group switching information in advance to the communication node to be accessed by the UE.

According to the transmission method of the disclosure, the one or more second communication nodes include a target satellite node corresponding to the UE in the first group when the UE is switched to the second group.

The operation that the group switching information is sent to the one or more second communication nodes includes the following operation.

The group information of the first group and the UE information of the UE in the first group are sent to the target satellite node.

Optionally, after receiving the group switching information from the first communication node, when it is determined that the multicast broadcast service of a first UE of the first group and the multicast broadcast service of a second UE of the second group belong to the same type of MBS service according to the group information of the first group and the UE information of the UE in the first group, the second communication node combines the first UE and the second UE into a single MBS group. For example, as shown in FIG. 2, when UE8 and UE9 are switched from the cell where the satellite base station 2 is located to the cell where the satellite base station 1 is located, if the multicast broadcast service received by UE8 and UE9 and the multicast broadcast service received by UE6 and UE7 of the cell where the satellite base station 1 is located belong to the same type of MBS service, the satellite base station 1 combines UE6, UE7, UE8 and UE9 into a single MBS group.

In an implementation, after the group switching information is sent to the one or more second communication nodes at the first moment, the method further includes the following operation.

Information of the second group fed back by one of the one or more second communication nodes is received.

The information of the second group includes at least one of:

a PCI where the second group is located;
a group service identifier corresponding to the second group;

a QoS flow of the second group;

configuration information of a shared tunnel of the second group;

configuration information of a layer 2 protocol stack of the second group;

physical layer configuration information of the second group;

UE information of a UE included in the second group; or an activation time and a deactivation time of the second group.

The UE information of the UE included in the second group includes at least one of:

a C-RNTI of the UE;

whether the UE is configured with a PTP channel; or whether the UE is configured with a DRB other than the multicast broadcast service.

Optionally, in the implementation, when the first communication node is a source satellite node of the UE in the first group, and the second communication node is a target satellite node corresponding to the UE in the first group when the UE is switched to the second group, the second communication node feeds the information of the second group back to the first communication node, such that the first communication node may send the information of the second group to the UE before the cell where the UE in the first group is located will be changed at the second moment. In this way, the UE is enabled to obtain resources of the group to be switched to in advance, thereby avoiding the service interruption due to the change of the multicast service group.

Optionally, in another implementation, when the first communication node is the source satellite node of the UE in the first group, after the group switching information is sent to the one or more second communication nodes at the first moment, the method further includes the following operation.

Air interface information of the second group is sent to the UE in the first group.

The air interface information of the second group includes at least one of:

the PCI where the second group is located;

the QoS flow of the second group;

the configuration information of the shared tunnel of the second group;

the configuration information of the layer 2 protocol stack of the second group;

the physical layer configuration information of the second group; or the activation time and the deactivation time of the second group.

With the implementation, the first communication node sends the information of the second group to the UE before the cell where the UE in the first group is located will be changed at the second moment, such that the UE obtains resources of the group to be switched to in advance, thereby avoiding service the interruption due to the change of the multicast service group.

In another implementation, the first communication node maintains a dynamic multicast service group list according to the information of the cell where the UE is located. The dynamic multicast service group list includes group information and resource information of at least two multicast groups, and optionally includes a switching time corresponding to each of the at least two multicast groups. For example, each group included in the dynamic multicast service group records respectively a cell ID, a satellite ID, a Group Radio Network Temporary Identity (G-RNTI), resource information, and a switching time when a corresponding group is switched.

During that the first group receives the multicast broadcast service, when it is determined that the cell where the UE in the first group is located will be changed at the second moment, the first communication node sends the group switching information to one or more second communication nodes at the first moment which is before the second moment, to trigger the second communication node to establish a connection in advance with the core network that supports the multicast broadcast service according to the group switching information.

Optionally, when the first communication node or the second communication node is the source satellite node of the UE in the first group, the source satellite node sends a multicast list to the UE according to the received group switching information. The multicast list includes at least one of:

the PCI where the second group is located;

the group service identifier corresponding to the second group;

the QoS flow of the second group;

the configuration information of a shared tunnel of the second group;

the configuration information of a layer 2 protocol stack of the second group;

the physical layer configuration information of the second group;

the UE information of the UE included in the second group; or the activation time and the deactivation time of the second group.

The UE information of the UE included in the second group includes at least one of:

the C-RNTI of the UE;

whether the UE is configured with the PTP channel; or whether the UE is configured with the DRB other than the multicast broadcast service.

In another implementation, optionally, when the first communication node is the source satellite node of the UE in the first group, the first communication node further sends the dynamic multicast service group list to the UE.

With the implementation, when it is determined that the cell where the UE in the first group is located will be changed at the second moment, the first communication node indicates to the UE which group in the dynamic multicast service group list should be enabled at present by sending an MAC CE signaling or a DCI signaling, such that the UE may determine the MBS group needed to be connected according to the group indicated by the first communication node and the dynamic multicast service group list obtained in advance.

In another implementation of the method for transmitting the multicast broadcast service of an embodiment of the disclosure, the one or more second communication nodes include the target satellite node corresponding to the UE in the first group when the UE is switched to the second group.

The operation that the group switching information is sent to the one or more second communication nodes includes the following operation.

Multicast path configuration information is sent to the target satellite node.

The first communication node shares a set of layer 2 protocol stack configuration with the target satellite node. Different target multicast broadcast services have the same tunnel information, the same MBS session information and the same MBS source multicast address between the first communication node and a core network.

With the implementation, the first communication node determines whether the cell where the UE is located changes according to the information of the cell where the UE is located, and maintains a dynamic multicast service group.

In addition, the tunnel information between the ground station and the core network is fixed, the MBS session information is fixed, and the MBS source multicast address is fixed. When the cell where the UE is located changes, that is, when it is about to enter the cell of the second communication node (i.e., the target satellite node), the ground station transforms the multicast data sending path to the base station corresponding to the second communication node, and pushes the same multicast configuration information as that of the source satellite node (e.g., the first communication node). In this way, an independent set of layer 2 protocol stack configuration, which is independent of the cell, is established for the multicast service. When the cell changes, the UE may directly use the configuration with the source satellite node.

Therefore, with the implementation, the first communication node determines whether the cell where the UE is located changes according to the information of the cell where the UE is located, and maintains a dynamic multicast service group. When it is determined that the cell where the UE is located changes, the first communication node sends the multicast path configuration information to the target satellite node of the cell which the UE needs to enter, so as to transform the data sending path to the target satellite node and to realize the group switching.

With the method for transmitting the multicast broadcast service of the embodiments of the disclosure, by determining the change of the multicast service group in advance, the communication node sends group switching information to a communication node to be accessed by the UE in the multicast service group before the multicast service group changes, to trigger the communication node obtaining the group switching information to establish a connection in advance with the core network that supports the multicast broadcast service, thereby avoiding service interruption due to the change of the multicast service group.

Figure 3:
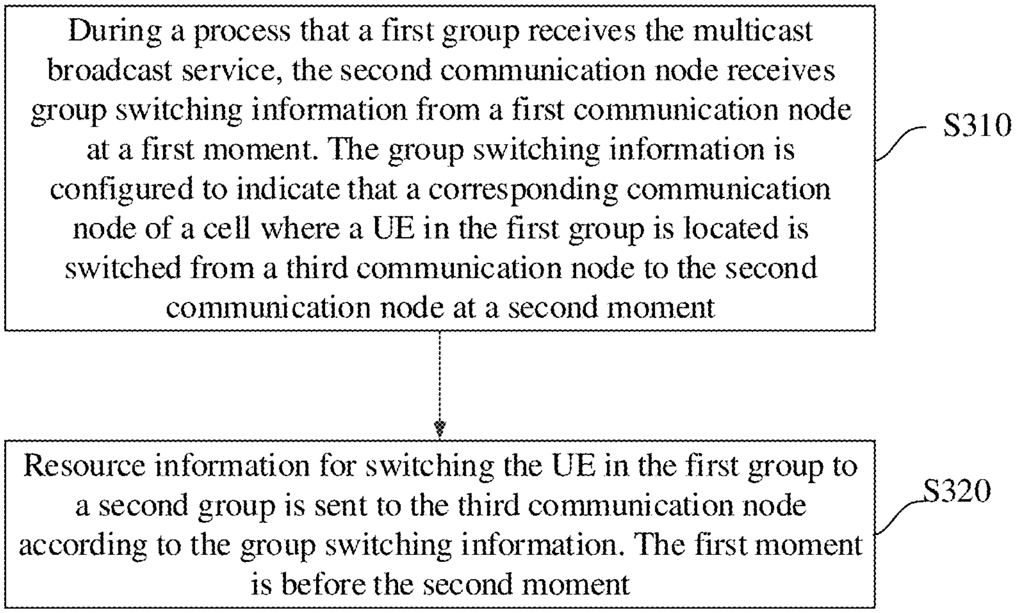
FIG. 3 is a flowchart illustrating a transmission method of an embodiment of the disclosure being applied to a second communication node.

In another aspect, an embodiment of the disclosure further provides a method for transmitting a multicast broadcast service, and the method is performed by a second communication node. As shown in FIG. 3, the method includes the following operations.

In operation S310, during that a first group receives the multicast broadcast service, the second communication node receives group switching information from a first communication node at a first moment. The group switching information is configured to indicate that a corresponding communication node of a cell where a UE in the first group is located will be switched from a third communication node to the second communication node at a second moment.

In operation S320, resource information for switching the UE in the first group to a second group is sent to the third communication node according to the group switching information.

The first moment is before the second moment.

With the method for transmitting the multicast broadcast service of the embodiments of the disclosure, by determining the change of the multicast service group in advance, the first communication node sends the group switching information to the second communication node to be accessed by the UE in the multicast service group before the multicast service group changes, to trigger the second communication node obtaining the group switching information to establish a connection in advance with the core network that supports the multicast broadcast service, and to send the resource information for switching the UE in the first group to the second group to the source communication node (the third communication node), thereby sending resources required for the UE to the source communication node in advance and avoiding the service interruption due to the change of the multicast service group.

Optionally, in the method for transmitting the multicast broadcast service, the group switching information includes:

group information of the first group and UE information of the UE in the first group.

Optionally, the method for transmitting the multicast broadcast service further includes the following operation.

A connection with a core network for the multicast broadcast service is established according to the group switching information before the second moment.

Optionally, the method for transmitting the multicast broadcast service further includes the following operation.

When a multicast broadcast service received by the UE in the first group and a multicast broadcast service received by a UE in a fourth group are of the same type of service, the UE in the first group and the UE in the fourth group are combined into a single group.

With the implementation, after receiving the group switching information from the first communication node, when it is determined that the multicast broadcast service of the first group and the multicast broadcast service received by the UE in the fourth group are of the same type of service according to the group information of the first group and the UE information of the UE in the first group, the second communication node combines the UE in the first group and the UE in the fourth group into a single group.

Optionally, in the method for transmitting the multicast broadcast service, the resource information includes at least one of:

a PCI where the second group is located;

a group service identifier corresponding to the second group;

a QoS flow of the second group;

configuration information of a shared tunnel of the second group;

configuration information of a layer 2 protocol stack of the second group;

physical layer configuration information of the second group;

information of a UE of the second group; or an activation time and a deactivation time of the second group.

The information of the UE of the second group includes at least one of:

a C-RNTI of the UE;

whether the UE is configured with a PTP channel; or whether the UE is configured with a DRB other than the multicast broadcast service.

Optionally, in the implementation, when the third communication node is a source satellite node of the UE in the first group, and the second communication node is a target satellite node corresponding to the UE in the first group when the UE is switched to the second group, the second communication node feeds information of the second group back to the third communication node, such that the third communication node may send the resource information of the second group to the UE before the cell where the UE in the first group is located will be changed at the second moment. In this way, the UE is enabled to obtain resources of the group to be switched to in advance, thereby avoiding the service interruption due to the change of the multicast service group.

Figure 4:
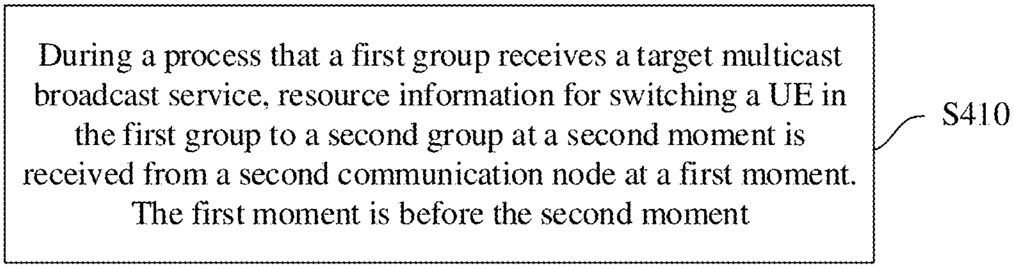
FIG. 4 is a flowchart illustrating a transmission method of an embodiment of the disclosure being applied to a third communication node.

An embodiment of the disclosure further provide a method for transmitting a multicast broadcast service, and the method is performed by a third communication node. As shown in FIG. 4, the method includes the following operation.

In operation S410, during that a first group receives a target multicast broadcast service, resource information for switching a UE in the first group to a second group at a second moment is received from a second communication node at a first moment.

The first moment is before the second moment.

In the method for transmitting the multicast broadcast service of the embodiment of the disclosure, the third communication node is the source satellite node of the UE in the first group. The source satellite node of the UE in the first group may obtain the resource information for switching the UE in the first group to the second group before the multicast service group changes, such that the source satellite node obtains the resource information required for the UE to be switched to the second group in advance before the multicast service group changes, thereby avoiding the service interruption due to the change of the multicast service group.

Optionally, the method for transmitting the multicast broadcast service further includes the following operation.

At least one of the following information is sent to the UE in the first group according to the resource information:

- group information of the second group;
- configuration information of the second group;
- a UE channel of the second group; or
- an activation time and a deactivation time of the second group.

With the implementation, the third communication node may send the resource information required for the UE to be switched to the second group to the UE in advance before the multicast service group changes, thereby avoiding the service interruption due to the change of the multicast service group.

Optionally, the method for transmitting the multicast broadcast service further includes the following operation.

A dynamic MBS group list is sent to the UE in the first group. The dynamic MBS group list includes group information and resource information of at least two multicast groups and a switching time corresponding to each of the at least two multicast groups.

After the resource information is received, the method further includes the following operation.

A switching instruction is sent to the UE. The switching instruction is configured to instruct the UE to switch to a multicast group in the dynamic MBS group list at the second moment.

Optionally, the switching instruction is an MAC CE signaling or a DCI signaling. With the implementation, the third communication node maintains the MBS group list, and the MBS group list may be sent from the first communication node (which may be one of the communication nodes or the central network node) to the third communication node. The third communication node indicates to the UE which group in the dynamic multicast service group list should be enabled at present by sending the switching instruction, such that the UE may determine the MBS group needed to be connected according to the group indicated by the third communication node and the dynamic multicast service group list obtained in advance.

Figure 5:
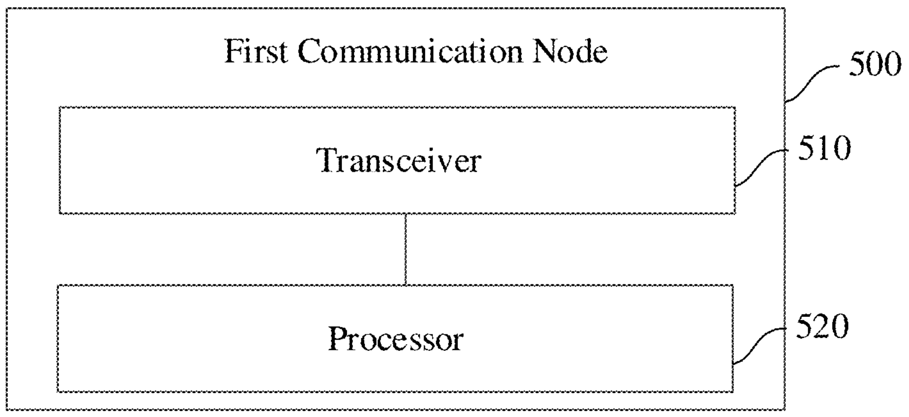
FIG. 5 is a structure diagram of a first implementation of a communication node of an embodiment of the disclosure.

An embodiment of the disclosure further provides a communication node, and the communication node is a first communication node. As shown in FIG. 5, the first communication node 500 includes a transceiver 510.

The transceiver 510 is configured to: during that a first group receives a multicast broadcast service, send group switching information to one or more second communication nodes at a first moment when it is determined that a cell where a UE(s) in the first group is located will be changed at a second moment.

The first moment is before the second moment.

Optionally, the communication node further includes a processor 520. The processor 520 is configured to:

- determine whether the cell where the UE is located will be changed at the second moment according to information of the cell where the UE is located.

The processor 520 is configured to determine the information of the cell where the UE is located according to at least one of:

- a satellite moving track;
- position of the UE;
- multicast service information;
- satellite type information; or
- mobility information of the UE.

Optionally, in the communication node, the transceiver 510 being configured to send the group switching information to the one or more second communication nodes at the first moment when it is determined that the cell where the UE in the first group is located will be changed at the second moment includes that the transceiver 510 is configured to:

- send the group switching information to the one or more second communication nodes at the first moment when it is determined that the cell where the UE in the first group is located will be changed at at least one second moment.

Each of the at least one second moment is different, and the first moment is a moment before each of the at least one second moment.

Optionally, in the communication node, the one or more second communication nodes include a target satellite node corresponding to the UE in the first group when the UE is switched to a second group.

The transceiver 510 being configured to send the group switching information to the one or more second communication nodes includes that the transceiver 510 is configured to:

- send group information of the first group and UE information of the UE in the first group to the target satellite node.

Optionally, in the communication node, after sending the group switching information to the one or more second communication nodes at the first moment, the transceiver 510 is further configured to:

- receive information of the second group fed back by one of the one or more second communication nodes.

The information of the second group includes at least one of:

- a PCI where the second group is located;
- a group service identifier corresponding to the second group;
- a QoS flow of the second group;
- configuration information of a shared tunnel of the second group;
- configuration information of a layer 2 protocol stack of the second group;
- physical layer configuration information of the second group;

UE information of a UE included in the second group; or an activation time and a deactivation time of the second group.

The UE information of the UE included in the second group includes at least one of:

a C-RNTI of the UE;

whether the UE is configured with a PTP channel; or whether the UE is configured with a DRB other than the multicast broadcast service.

Optionally, in the communication node, after sending the group switching information to the one or more second communication nodes at the first moment, the transceiver 510 is further configured to:

send air interface information of the second group to the UE in the first group.

The air interface information of the second group includes at least one of:

the PCI where the second group is located;

the QoS flow of the second group;

the configuration information of a shared tunnel of the second group;

the configuration information of a layer 2 protocol stack of the second group;

the physical layer configuration information of the second group; or the activation time and the deactivation time of the second group.

Optionally, the one or more second communication nodes include the target satellite node corresponding to the UE in the first group when the UE is switched to the second group.

The transceiver 510 being configured to send the group switching information to the one or more second communication nodes includes that the transceiver 510 is configured to:

send multicast path configuration information to the target satellite node.

The first communication node shares a set of layer 2 protocol stack configuration with the target satellite node, and different target multicast broadcast services have the same tunnel information, the same MBS session information and the same MBS source multicast address between the first communication node and a core network.

Figure 6:
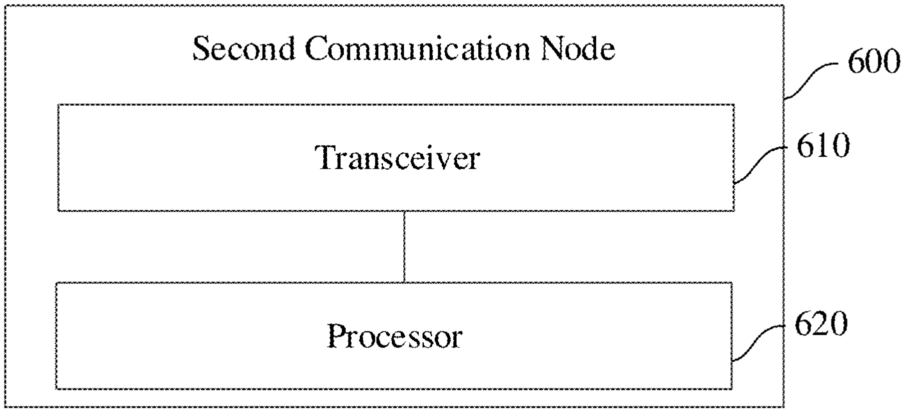
FIG. 6 is a structure diagram of a second implementation of a communication node of an embodiment of the disclosure.

An embodiment of the disclosure further provides a communication node, and the communication node is a second communication node. As shown in FIG. 6, the second communication node 600 includes a transceiver 610. The transceiver 610 is configured to:

receive group switching information from a first communication node at a first moment during that a first group receives a multicast broadcast service. The group switching information is configured to indicate that a corresponding communication node of a cell where a UE in the first group is located will be switched from a third communication node to the second communication node at a second moment;

send resource information for switching the UE in the first group to a second group to the third communication node according to the group switching information.

The first moment is before the second moment.

Optionally, in the communication node, the group switching information includes:

group information of the first group and UE information of the UE in the first group.

Optionally, the communication node further includes a processor 620. The processor 620 is configured to:

establish a connection with a core network for the multicast broadcast service before the second moment according to the group switching information.

Optionally, the communication node further includes the processor 620. The processor 620 is configured to:

when a multicast broadcast service received by the UE in the first group and a multicast broadcast service received by a UE in a fourth group are of the same type of service, combine the UE in the first group and the UE in the fourth group into a single group.

Optionally, in the communication node, the resource information includes at least one of:

a PCI where the second group is located;

a group service identifier corresponding to the second group;

a QoS flow of the second group;

configuration information of a shared tunnel of the second group;

configuration information of a layer 2 protocol stack of the second group;

physical layer configuration information of the second group;

information of a UE of the second group; or an activation time and a deactivation time of the second group.

The information of the UE of the second group includes at least one of:

a C-RNTI of the UE;

whether the UE is configured with a PTP channel; or whether the UE is configured with a DRB other than the multicast broadcast service.

Figure 7:
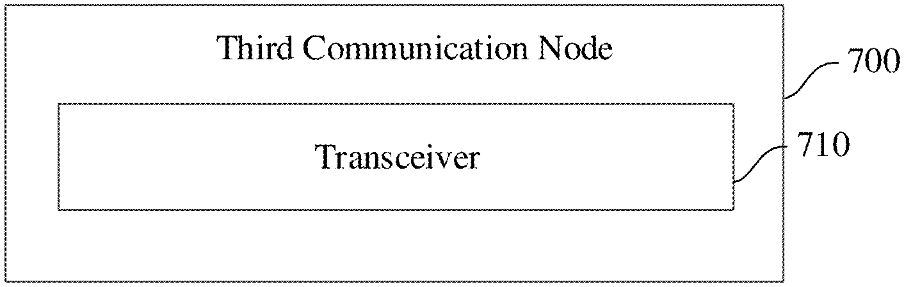
FIG. 7 is a structure diagram of a third implementation of a communication node of an embodiment of the disclosure.

An embodiment of the disclosure further provides a communication node, and the communication node is a third communication node. As shown in FIG. 7, the third communication node 700 includes a transceiver 710. The transceiver 710 is configured to:

during that a first group receives a target multicast broadcast service, receive, from a second communication node at a first moment, resource information for switching a UE in the first group to a second group at a second moment.

The first moment is before the second moment.

Optionally, in the communication node, the transceiver 710 is further configured to:

send at least one of the following information to the UE in the first group according to the resource information:

group information of the second group;

configuration information of the second group;

a UE channel of the second group; or an activation time and a deactivation time of the second group.

Optionally, in the communication node, the transceiver 710 is further configured to:

send a dynamic MBS group list to the UE in the first group. The dynamic MBS group list includes group information and resource information of at least two multicast groups and a switching time corresponding to each of the at least two multicast groups.

After receiving the resource information, the transceiver 710 is further configured to:

send a switching instruction to the UE. The switching instruction is configured to instruct the UE to switch to a multicast group in the dynamic MBS group list at the second moment.

Optionally, in the communication node, the switching instruction is sent through an MAC CE or a DCI signaling.

Figure 8:
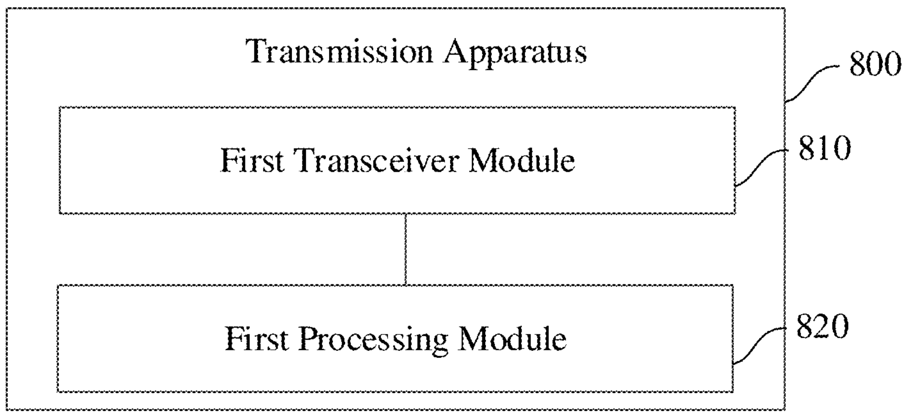
FIG. 8 is a structure diagram of a first implementation of a transmission structure of an embodiment of the disclosure.

An embodiment of the disclosure further provides an apparatus for transmitting a multicast broadcast service, and the apparatus is applied to a first communication node. As shown in FIG. 8, the transmission apparatus 800 includes a first transceiver module 810.

The first transceiver module 810 is configured to: during that a first group receives the multicast broadcast service, send group switching information to one or more second communication nodes at a first moment when it is determined that a cell where a UE(s) in the first group is located will be changed at a second moment.

The first moment is before the second moment.

Optionally, the apparatus for transmitting the multicast broadcast service further includes a first processing module 820.

The first processing module 820 is configured to determine whether the cell where the UE is located will be changed at the second moment according to information of the cell where the UE is located.

The first processing module 820 determines the information of the cell where the UE is located according to at least one of:

- a satellite moving track;
- position of the UE;
- multicast service information;
- satellite type information; or
- mobility information of the UE.

Optionally, in the apparatus for transmitting the multicast broadcast service, the first transceiver module 810 is configured to send the group switching information to the one or more second communication nodes at the first moment when it is determined that the cell where the UE in the first group is located will be changed at the second moment, which includes that the first transceiver module 810 is configured to:

- send the group switching information to the one or more second communication nodes at the first moment when it is determined that the cell where the UE in the first group is located will be changed at at least one second moment.

Each of the at least one second moment is different, and the first moment is a moment before each of the at least one second moment.

Optionally, in the apparatus for transmitting the multicast broadcast service, the one or more second communication nodes include a target satellite node corresponding to the UE in the first group when the UE is switched to a second group.

The first transceiver module 810 being configured to send the group switching information to the one or more second communication nodes includes that the first transceiver module 810 is configured to:

- send group information of the first group and UE information of the UE in the first group to the target satellite node.

Optionally, in the apparatus for transmitting the multicast broadcast service, after sending the group switching information to the one or more second communication nodes at the first moment, the first transceiver module 810 is further configured to:

- receive information of the second group fed back by one of the one or more second communication nodes.

The information of the second group includes at least one of:

- a PCI where the second group is located;
- a group service identifier corresponding to the second group;
- a QoS flow of the second group;
- configuration information of a shared tunnel of the second group;
- configuration information of a layer 2 protocol stack of the second group;
- physical layer configuration information of the second group;
- UE information of a UE included in the second group; or
- an activation time and a deactivation time of the second group.

The UE information of the UE included in the second group includes at least one of:

- a C-RNTI of the UE;
- whether the UE is configured with a PTP channel; or
- whether the UE is configured with a DRB other than the multicast broadcast service.

Optionally, in the apparatus for transmitting the multicast broadcast service, after sending the group switching information to the one or more second communication nodes at the first moment, the first transceiver module 810 is further configured to:

- send air interface information of the second group to the UE in the first group.

The air interface information of the second group includes at least one of:

- the PCI where the second group is located;
- the QoS flow of the second group;
- the configuration information of a shared tunnel of the second group;
- the configuration information of a layer 2 protocol stack of the second group;
- the physical layer configuration information of the second group; or
- the activation time and the deactivation time of the second group.

Optionally, in the apparatus for transmitting the multicast broadcast service, the one or more second communication nodes include the target satellite node corresponding to the UE in the first group when the UE is switched to the second group.

The first transceiver module 810 being configured to send the group switching information to the one or more second communication nodes includes that the first transceiver module 810 is configured to:

- send multicast path configuration information to the target satellite node.

The first communication node shares a set of layer 2 protocol stack configuration with the target satellite node, and different target multicast broadcast services have the same tunnel information, the same MBS session information and the same MBS source multicast address between the first communication node and a core network.

Figure 9:
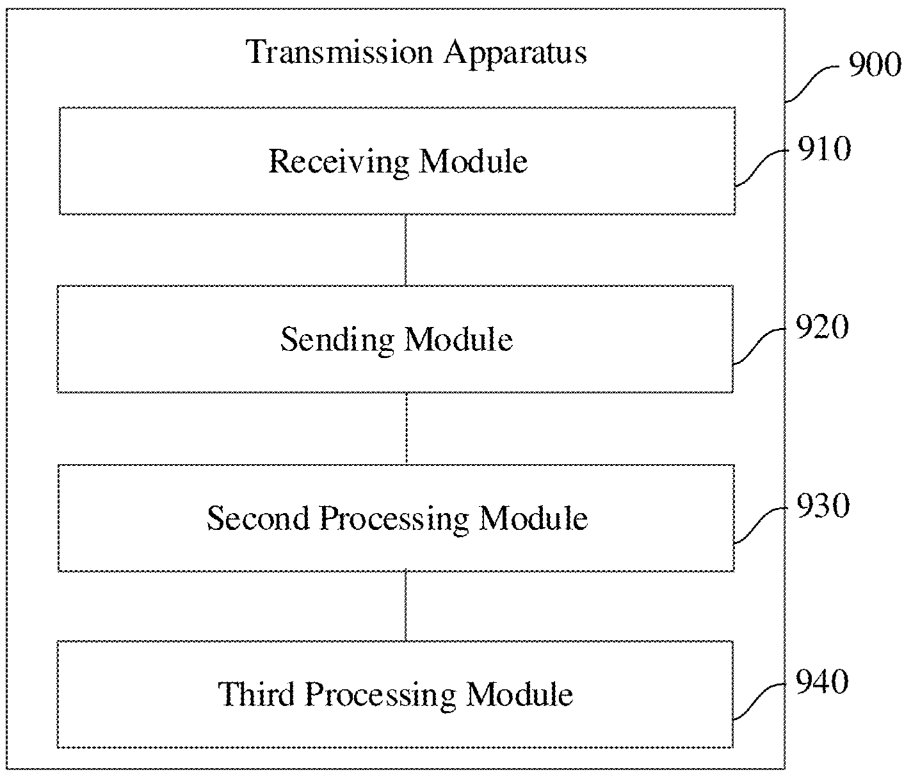
FIG. 9 is a structure diagram of a second implementation of a transmission structure of an embodiment of the disclosure.

An embodiment of the disclosure further provides an apparatus for transmitting a multicast broadcast service, and the apparatus is applied to a second communication node. As shown in FIG. 9, the transmission apparatus 900 includes a receiving module 910 and a sending module 920.

The receiving module 910 is configured to receive group switching information from a first communication node at a first moment during that a first group receives the multicast broadcast service. The group switching information is configured to indicate that a corresponding communication node of a cell where a UE in the first group is located will be switched from a third communication node to the second communication node at a second moment.

The sending module 920 is configured to send resource information for switching the UE in the first group to a second group to the third communication node according to the group switching information.

The first moment is before the second moment.

Optionally, in the apparatus for transmitting the multicast broadcast service, the group switching information includes:

group information of the first group and UE information of the UE in the first group.

Optionally, the apparatus for transmitting the multicast broadcast service further includes a second processing module 930.

The second processing module 930 is configured to establish a connection with a core network for the multicast broadcast service before the second moment according to the group switching information.

Optionally, the apparatus for transmitting the multicast broadcast service further includes a third processing module 940.

The third processing module 940 is configured to combine the UE in the first group and a UE in a fourth group into a single group when a multicast broadcast service received by the UE in the first group and a multicast broadcast service received by the UE in the fourth group are of the same type of service.

Optionally, in the apparatus for transmitting the multicast broadcast service, the resource information includes at least one of:

a PCI where the second group is located;

a group service identifier corresponding to the second group;

a QoS flow of the second group;

configuration information of a shared tunnel of the second group;

configuration information of a layer 2 protocol stack of the second group;

physical layer configuration information of the second group;

information of a UE of the second group; or an activation time and a deactivation time of the second group.

The information of the UE of the second group includes at least one of:

a C-RNTI of the UE;

whether the UE is configured with a PTP channel; or whether the UE is configured with a DRB other than the multicast broadcast service.

Figure 10:
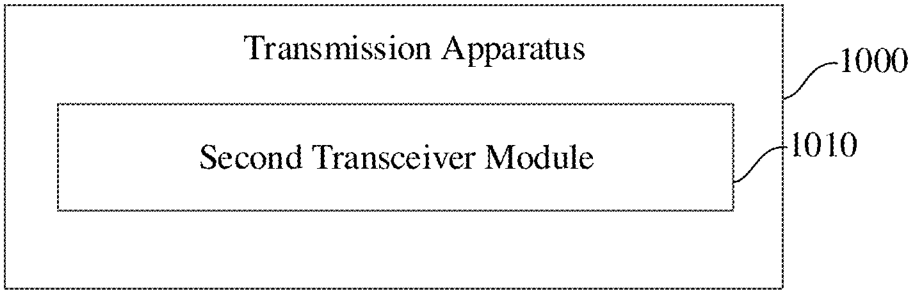
FIG. 10 is a structure diagram of a third implementation of a transmission structure of an embodiment of the disclosure.

An embodiment of the disclosure further provides an apparatus for transmitting a multicast broadcast service, and the apparatus is applied to a third communication node. As shown in FIG. 10, the transmission apparatus 1000 includes a second transceiver module 1010.

The second transceiver module 1010 is configured to: during that a first group receives a target multicast broadcast service, receive resource information for switching a UE in the first group to a second group at a second moment from a second communication node at a first moment.

The first moment is before the second moment.

Optionally, in the apparatus for transmitting the multicast broadcast service, the second transceiver module 1010 is further configured to:

send at least one of the following information to the UE in the first group according to the resource information:

group information of the second group;

configuration information of the second group;

a UE channel of the second group; or an activation time and a deactivation time of the second group.

Optionally, in the apparatus for transmitting the multicast broadcast service, the second transceiver module 1010 is further configured to:

send a dynamic MBS group list to the UE in the first group. The dynamic MBS group list includes group information and resource information of at least two multicast groups and a switching time corresponding to each of the at least two multicast groups.

After receiving the resource information, the second transceiver module 1010 is further configured to:

send a switching instruction to the UE. The switching instruction is configured to instruct the UE to switch to a multicast group in the dynamic MBS group list at the second moment.

Optionally, in the apparatus for transmitting the multicast broadcast service, the switching instruction is sent through an MAC CE or a DCI signaling.

An embodiment of the disclosure further provides a network device, including a processor, a memory and a program stored on the memory and executable on the processor. The program implements, when executed by the processor, the method for transmitting the multicast broadcast service of any one of the above.

Specifically, the network device may be the aforementioned first communication node, second communication node or third communication node. The specific implementation for executing the aforementioned transmission method may be referred to the above description and would not be described in detail herein.

In addition, a specific embodiment of the disclosure further provides a computer-readable storage medium having stored thereon a computer program. The program implements, when executed by a processor, the steps of the method for transmitting the multicast broadcast service of any one of the above.

In some embodiments provided by the disclosure, it is to be understood that the disclosed methods and apparatuses may be implemented in other manners. For example, the above-mentioned embodiments of the device are only schematic. For example, the division of the unit is only a logical functional division, and in practice, there may be another division manner. For example, multiple units or components may be combined or integrated into another system, or some features may be ignored or not performed. On the other hand, the coupling or direct coupling or communication connection between each other illustrated or discussed may be indirect coupling or communication connection through some interface, device or unit, and may be electrical, mechanical or other forms.

In addition, the functional units in various embodiments of the disclosure may be integrated into a single processing unit, or may be physically included in each unit separately, or two or more units may be integrated into a single unit. The aforementioned integrated units may be implemented in the form of hardware, or in the form of hardware and software functional units.

The aforementioned integrated unit implemented in the form of a software function unit may be stored in a computer-readable storage medium. The aforementioned software function unit is stored in a storage medium, including multiple instructions configured to enable a computer device (which may be a personal computer, a server, a network device, or the like) to execute part of the operations of the methods for transmitting the multicast broadcast service methods of various embodiments of the disclosure. The aforementioned storage medium includes various media that may store program codes, such as a USB disk, a mobile hard disk, a Read-Only Memory (ROM), a Random Access Memory (RAM), a magnetic disk, an compact disk, or the like.

The above are preferred implementations of the disclosure. It is to be noted that for those of ordinary skill in the art, a number of improvements and embellishments may be made without departing from the principle described in the disclosure, and these improvements and embellishments should also be regarded as the scope of protection of the disclosure.

The invention claimed is:

1. A method for transmitting a multicast broadcast service, performed by a first communication node, comprising:

during that a first group receives the multicast broadcast service, when it is determined that a cell where a User Equipment (UE) (s) in the first group is located will be changed at a second moment, sending group switching information to one or more second communication nodes at a first moment, wherein the first moment is before the second moment, wherein the one or more second communication nodes comprise a target satellite node corresponding to the UE in the first group when the UE is switched to a second group;

wherein sending the group switching information to the one or more second communication nodes comprises: sending multicast path configuration information to the target satellite node;

wherein the first communication node shares a set of layer 2 protocol stack configuration with the target satellite node, and different target multicast broadcast services have same tunnel information, same Multicast Broadcast Service (MBS) session information and a same MBS source multicast address between the first communication node and a core network.

2. The method for transmitting the multicast broadcast service of claim 1, wherein determining that the cell where the UE in the first group is located will be changed at the second moment comprises:

determining, according to information of the cell where the UE is located, whether the cell where the UE is located will be changed at the second moment;

wherein the information of the cell where the UE is located is determined according to at least one of:

a satellite moving track;

position of the UE;

multicast service information;

satellite type information; or mobility information of the UE.

3. The method for transmitting the multicast broadcast service of claim 1, wherein when it is determined that the cell where the UE in the first group is located will be changed at the second moment, sending the group switching information to the one or more second communication nodes at the first moment comprises:

sending the group switching information to the one or more second communication nodes at the first moment when it is determined that the cell where the UE in the first group is located will be changed at at least one second moment, wherein each of the at least one second moment is different, and the first moment is a moment before each of the at least one second moment.

4. The method for transmitting the multicast broadcast service of claim 1, wherein the one or more second communication nodes comprise a target satellite node corresponding to the UE in the first group when the UE is switched to a second group, wherein sending the group switching information to the one or more second communication nodes comprises:

sending group information of the first group and UE information of the UE in the first group to the target satellite node.

5. The method for transmitting the multicast broadcast service of claim 1, wherein after sending the group switching information to the one or more second communication nodes at the first moment, the method further comprises:

receiving information of a second group fed back by one of the one or more second communication nodes;

wherein the information of the second group comprises at least one of:

a Physical Cell Identifier (PCI) where the second group is located;

a group service identifier corresponding to the second group;

a Quality of Service (QoS) flow of the second group;

configuration information of a shared tunnel of the second group;

configuration information of a layer 2 protocol stack of the second group;

physical layer configuration information of the second group;

UE information of a UE comprised in the second group; or an activation time and a deactivation time of the second group;

wherein the UE information of the UE comprised in the second group comprises at least one of:

a Cell-Radio Network Temporary Identifier (C-RNTI) of the UE;

whether the UE is configured with a Precision Time Protocol (PTP) channel; or whether the UE is configured with a Data Radio Bearer (DRB) other than the multicast broadcast service.

6. The method for transmitting the multicast broadcast service of claim 1, wherein after sending the group switching information to the one or more second communication nodes at the first moment, the method further comprises:

sending air interface information of a second group to the UE in the first group;

wherein the air interface information of the second group comprises at least one of:

a Physical Cell Identifier (PCI) where the second group is located;

a Quality of Service (QoS) flow of the second group;

configuration information of a shared tunnel of the second group;

configuration information of a layer 2 protocol stack of the second group;

physical layer configuration information of the second group; or an activation time and a deactivation time of the second group.

7. A method for transmitting a multicast broadcast service, performed by a second communication node, comprising:

during that a first group receives the multicast broadcast service, receiving, by the second communication node, group switching information from a first communication node at a first moment, wherein the group switching information is configured to indicate that a corresponding communication node of a cell where a User Equipment (UE) (s) in the first group is located will be switched from a third communication node to the second communication node at a second moment; and sending, according to the group switching information, resource information for switching the UE in the first group to a second group to the third communication node;

wherein the first moment is before the second moment, wherein the method further comprises:

establishing, according to the group switching information, a connection with a core network for the multicast broadcast service before the second moment.

8. The method for transmitting the multicast broadcast service of claim 7, wherein the group switching information comprises:

group information of the first group and UE information of the UE in the first group.

9. The method for transmitting the multicast broadcast service of claim 7, further comprising:

combining, when a multicast broadcast service received by the UE in the first group and a multicast broadcast service received by a UE in a fourth group are of a same type of service, the UE in the first group and the UE in the fourth group into a single group.

10. The method for transmitting the multicast broadcast service of claim 7, wherein the resource information comprises at least one of:

a Physical Cell Identifier (PCI) where the second group is located;

a group service identifier corresponding to the second group;

a Quality of Service (QoS) flow of the second group;

configuration information of a shared tunnel of the second group;

configuration information of a layer 2 protocol stack of the second group;

physical layer configuration information of the second group;

information of a UE of the second group; or an activation time and a deactivation time of the second group;

wherein the information of the UE of the second group comprises at least one of:

a Cell-Radio Network Temporary Identifier (C-RNTI) of User Equipment (UE);

whether the UE is configured with a Precision Time Protocol (PTP) channel; or whether the UE is configured with a Data Radio Bearer (DRB) other than the multicast broadcast service.

11. A method for transmitting a multicast broadcast service, performed by a third communication node, comprising:

during that a first group receives a target multicast broadcast service, receiving, from a second communication node at a first moment, resource information for switching a User Equipment (UE) (s) in the first group to a second group at a second moment, wherein the first moment is before the second moment, wherein the method further comprises:

sending a dynamic Multicast Broadcast Service (MBS) group list to the UE in the first group, wherein the dynamic MBS group list comprises group information and resource information of at least two multicast groups and a switching time corresponding to each of the at least two multicast groups;

wherein after receiving the resource information, the method further comprises:

sending a switching instruction to the UE, wherein the switching instruction is configured to instruct the UE to switch to a multicast group in the dynamic MBS group list at the second moment.

12. The method for transmitting the multicast broadcast service of claim 11, further comprising:

sending, to the UE in the first group, according to the resource information, at least one of:

group information of the second group;

configuration information of the second group;

a UE channel of the second group; or an activation time and a deactivation time of the second group.

13. The method for transmitting the multicast broadcast service of claim 11, wherein the switching instruction is sent through a Medium Access Control Control Element (MAC CE) or a Downlink Control Information (DCI) signaling.

14. A communication node, wherein the communication node is a first communication node and comprises a transceiver configured to perform the method of claim 1.

15. A communication node, wherein the communication node is a second communication node and comprises a transceiver configured to perform the method of claim 7.

16. A communication node, wherein the communication node is a third communication node and comprises a transceiver configured to perform the method of claim 11.

* * * * *